United States Patent
Ragnoli et al.

(10) Patent No.: US 12,401,513 B2
(45) Date of Patent: Aug. 26, 2025

(54) SYSTEM AND METHOD FOR PROVING MEMBERSHIP OF SUBSET FROM GIVEN SET AND LINEAR OPERATION THEREFOR

(71) Applicant: QPQ Ltd., Dublin (IE)

(72) Inventors: Emanuele Ragnoli, Dublin (IE); Zaira Pindado Tost, Barcelona (ES)

(73) Assignee: QPQ Ltd., Dublin (IE)

( * ) Notice: Subject to any disclaimer, the term of this patent is extended or adjusted under 35 U.S.C. 154(b) by 269 days.

(21) Appl. No.: 17/974,629

(22) Filed: Oct. 27, 2022

(65) Prior Publication Data

US 2024/0154811 A1     May 9, 2024

(51) Int. Cl.
*H04L 9/32* (2006.01)
*H04L 9/30* (2006.01)

(52) U.S. Cl.
CPC .......... *H04L 9/3221* (2013.01); *H04L 9/3066* (2013.01); *H04L 9/3093* (2013.01)

(58) Field of Classification Search
None
See application file for complete search history.

(56) References Cited

U.S. PATENT DOCUMENTS

| | | | | |
|---|---|---|---|---|
| 11,526,622 B1 * | 12/2022 | White | ................... | G06F 16/252 |
| 2009/0300347 A1 * | 12/2009 | Camenisch | ........... | H04L 9/3247 |
| | | | | 713/155 |

FOREIGN PATENT DOCUMENTS

| | | | | |
|---|---|---|---|---|
| CN | 113643029 A | * | 11/2021 | ........... H04L 9/3218 |
| EP | 3926889 A1 | * | 12/2021 | ............... H04L 9/30 |
| WO | WO-2015055765 A1 | * | 4/2015 | ........... H04L 9/3218 |
| WO | WO-2022144966 A1 | * | 7/2022 | ........... H04L 9/3218 |

OTHER PUBLICATIONS

Yuen et al. "RingCT 3.0 Blockchain Confidential Transaction: Shorter Size and Stronger Security", May 2019, IACR, International Association for Cryptography Research, URL: https://eprint.iacr.org/2019/508 (Year: 2019).*

Feist, "Inner Product Arguments", Jul. 27, 2021, URL: https://dankradfeist.de/ethereum/2021/07/27/inner-product-arguments.html (Year: 2021).*

(Continued)

*Primary Examiner* — Philip J Chea
*Assistant Examiner* — Bin Qing Zheng
(74) *Attorney, Agent, or Firm* — Foley & Lardner LLP (57) ABSTRACT

A method for providing a zero-knowledge membership proof is provided. The method comprises defining public parameters to be used for computing and verification of proof by a prover and a verifier, respectively. The method comprises computing, by the prover, a commitment to a given ordered set X using the public parameters, and sending it to the verifier. The method further comprises receiving, by the prover, a query from the verifier for proving membership of a subset S sampled from the given ordered set X. The method further comprises computing, by the prover, a proof of membership, including an inner product, commitments of polynomials defining the inner product and a proof of the inner product being correctly computed, and sending the proof of membership to the verifier. The method further comprises verifying, by the verifier, the proof of membership based on the defined public parameters.

18 Claims, 4 Drawing Sheets

(56) References Cited

OTHER PUBLICATIONS

Campanelli, "Succinct Zero-Knowledge Batch Proofs for Set Accumulators", 2021, URL: https://eprint.iacr.org/2021/1672.pdf (Year: 2021).*
Catalano et al., Vector Commitments and their Applications, 2011, 37 pgs.
Papamanthou et al., Optimal Verifciation of Operations on Dynamic Sets, 2010, 20 pgs.
Merkle, Ralph C., A Digital Signature Based on a Conventional Encryption Function, 10 pgs.
Campanelli, et al., Linear-map Vector Commitments and their Practial Applications, 2022, 41 pgs.
Benarroch, et al., Zero-Knowledge Proofs for Set Membership: Efficient, Succinct, Modular, 2019, 68 pgs.
Kuszmaul, John, Verkle Trees, 2018, 12 pgs.
Bunz, et al., Bulletproofs: Short Proofs for Confidential Transactions and More, 2018, 45 pgs.
Tsz Hon Yuen et al: "RingCT 3.0 for Block chain Confidential Transaction: Shorter Size and Stronger Security",. IACR, International Association for Cryptologic Research, vol. 20190520:125407 May 20, 2019 (May 20, 2019), pp. 1-30, XP061032693, Retrieved from the Internet: URL:http://eprint.iacr.org/2019/508.pdf, [retrieved on May 16, 2019], Section 2 .1., Section 3.1., Section B., Section C.

* cited by examiner

SYSTEM AND METHOD FOR PROVING MEMBERSHIP OF SUBSET FROM GIVEN SET AND LINEAR OPERATION THEREFOR

FIELD OF THE PRESENT DISCLOSURE

The present disclosure generally relates to verifiable computing, and more particularly to a system and method for providing zero-knowledge membership proofs to prove a subset belongs to a set while keeping both secret, and also the correctness of a linear operation over this subset.

BACKGROUND

Verifiable computing (or verified computation or verified computing) enables a computer to offload the computation of some function, to other perhaps clients, while maintaining verifiable results. The other clients evaluate the function and return the result with a proof that the computation of the function was carried out correctly. Verifiable computing applied to database technologies, where the execution of a data query on a dataset is complete, correct, and done with real time dataset updates without revealing the underlying dataset, is an active area of research without robust products and technologies. In some scenarios, the clients to whom the computational tasks are outsourced may not be trustworthy. In such cases, the systems employing verifiable computing may find it difficult to confirm an accuracy of the outsourced computational tasks. For such scenarios, a proof of the performed computational tasks may be generated by the client and send to the users along with the computational tasks. However, the conventional systems fail to guarantee completeness and accuracy of the computational tasks in real-time, without revelation of the underlying dataset.

Zero-knowledge proofs have been implemented in the state of art to resolve such issues. Zero-knowledge proofs are a fundamental family of cryptographic primitives that have been used in multiple applications in the last decades. A zero-knowledge proof is a proof system between two parties, the prover and the verifier, which allows to prove some statement without revealing anything beyond its validity. These proof systems have been used in practice for guaranteeing the correctness of transactions in cryptocurrencies, for verifiable computation to delegate a costly computation and receive the result along with a proof that guarantees the correctness of it, for verifying shuffles, etc. Concretely, zero-knowledge proofs for verifiable privacy-preserving analytic queries are used where a query to secret data is answered along with a proof of correctness while keeping the data entries secret.

A membership proof is a particular case of zero-knowledge proof systems that guarantees some secret value, or many secret values, belongs to a set without revealing it, or them. This proof system can be used in any application that requires a linear operation of elements sampled from a larger set where privacy of the elements of the set is required. For example, in data analysis of private large datasets, one can select a subset and compute a linear operation like a sum or an average over the elements of this subset and provide a proof for both correctness of the operation and membership proof of the subset. Herein, proving set membership with privacy has many applications itself, for example in a blockchain for claiming ownership of assets or proving a coin belongs to the unspent set of coins, or in finance for proving individuals or companies belong to a set of accepted identities while keeping the identification secret.

There are some schemes employed in the art for such implementations. For instance, cryptographic accumulators have been used to compress a set of elements into a short value which, in turn, allow to generate membership proofs like those with vector commitments [See: Dario Catalano and Dario Fiore, Vector Commitments and Their Applications, Public-Key Cryptography 2013]. However, privacy is not always achieved in these constructions (for example, in Merkle tree approaches), or they require a trusted third party like Verkle trees [See: John Kuszmaul—Verkle Trees, https://math.mit.edu/research/highschool/primes/materials/2018/Kuszmaul.pdf, 2018]. Moreover, the discussed approaches does not provide means for proving a linear operation over the set of elements with proved membership, if required.

There exist other schemes that combine zk-SNARKs (Zero-Knowledge Succinct Non-Interactive Argument of Knowledge) for proving correctness of an operation with accumulators, which are in fact efficient in proof size and verification time, but those schemes require pre-processing computations and trusted-third party, such as Campanelli et al. [See: Matteo Campanelli, Anca Nitulescu, Carla Rafols, Alexandros Zacharakis, and Arantxa Zapico, Linear-map Vector Commitments and their Practical Applications, https://eprint.iacr.org/2022/705.pdf, 2022]. On the other hand, there are other membership proofs schemes such as Benarroch et al. [See: Daniel Benarroch, Matteo Campanelli, Dario Fiore, Kobi Gurkan, and Dimitris Kolonelos, Zero-Knowledge Proofs for Set Membership: Efficient, Succinct, Modular. Financial Cryptography and Data Security, 2021] which preserves privacy of operation while proving membership of an element into a set, and also proves that the said element holds some property. However, Benarroch et al. only offers an efficient solution for proving membership of one element.

The present disclosure has been made in view of such considerations, and it is an object of the present disclosure to provide a system and method for providing zero-knowledge proof for proving membership of a subset sampled from a given set and the correctness of linear operations over the elements of the subset in a privacy-preserving and efficient manner.

SUMMARY

In consideration of the known schemes (as discussed) and with the objective of the present disclosure not being any arbitrary operation but specific linear operation over elements of the subset with proved membership, there is scope to improve privacy and efficiency for implementing membership proofs. The present disclosure takes advantage of the membership proof that proves a membership of elements of a subset in a given ordered set and a correctness for linear operations over the said elements without increasing complexities of employed techniques. The proposed proof scheme offers privacy because it is zero-knowledge and the only information that is outputted from the proof is the result of the linear operation over the elements of the subset. Moreover, the proposed scheme offers a membership proof of a subset, a generalization to one or more elements.

In an aspect of the present disclosure, a method for providing a zero-knowledge membership proof is provided. The method comprises defining, in a setup phase, public parameters to be used for computing and verification of proof by a prover and a verifier, respectively. The method further comprises computing, by the prover, a commitment using the public parameters to a given ordered set X. The method further comprises sending, by the prover, the commitment to the given ordered set X to the verifier. The method further comprises receiving, by the prover, a query from the verifier for proving membership of a subset S sampled from the given ordered set X. The method further comprises computing, by the prover, a proof of membership providing that elements in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing elements of the vector $\vec{x}$ that are selected in same position as in the vector $\vec{x}$, and 0 in non-selected positions, based, at least in part, on the defined public parameters. The method further comprises sending, by the prover, the proof of membership to the verifier. The method further comprises verifying, by the verifier, the proof of membership based on the defined public parameters.

In one or more embodiments, the prover, using the commitment, further claims to have computed a correct result for each of one or more linear operations performed over elements of the subset S.

In one or more embodiments, the query, received by the prover, from the verifier, further comprises a request for value Y resultant of a given linear operation performed over elements of the subset S. In such embodiments, the method further comprises adding, by the prover, a matrix representative of the given linear operation to be performed over elements of the subset S to modify polynomials used to compute an inner product; and checking, by the verifier, for the modified polynomials while verifying the inner product.

In one or more embodiments, the method further comprises updating the commitment, using the public parameters, in case of addition of new elements to the given ordered set X.

In one or more embodiments, the proof of membership is defined over an elliptic curve group.

In one or more embodiments, the commitments to the sets are computed by the prover by implementing the Pedersen commitment scheme.

In another aspect of the present disclosure, a system for performing data analysis on private data by implementing a zero-knowledge membership proof is provided. The system comprises a data provider device comprising a database configured to store private data therein. The system also comprises a data owner device, acting as a prover, configured to access and process the private data from the database. The system further comprises a client device, acting as a verifier, configured to provide a query related to a group of elements of the private data for performing data analysis therefor. Herein, public parameters to be used for computing and verification of proof by the prover and the verifier, respectively, are defined in a setup phase and shared therewith. Further, the prover is configured to compute a commitment using the public parameters to elements of the private data, defined as a given ordered set X, and send the commitment to the given ordered set X to the verifier. The verifier is configured to send the query, to the prover, for proving membership of the said group of elements defined as a subset S sampled from the said given ordered set X. The prover is further configured to: compute a proof of membership providing that the group of elements in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing the group of elements of the vector $\vec{x}$ that are selected in same position as in the vector $\vec{x}$, and 0 in non-selected positions, based on the defined public parameters, and send the proof of membership to the verifier. The verifier is further configured to verify the proof of membership based on the defined public parameters.

In one or more embodiments, the prover, using the commitment, further claims to have computed a correct result for each of one or more linear operations performed over elements of the subset S.

In one or more embodiments, the query, received by the prover, from the verifier, further comprises a request for value Y resultant of a given linear operation performed over elements of the subset S. In such embodiments, the prover is configured to add a matrix representative of the given linear operation to be performed over elements of the subset S to modify polynomials used to compute an inner product. Further, the verifier is configured to check for the modified polynomials while verifying the inner product.

In one or more embodiments, the prover is further configured to update the commitment, using the public parameters, in case of addition of new elements to the private data.

In one or more embodiments, the proof of membership is defined over an elliptic curve group.

In one or more embodiments, the commitment is a Pedersen commitment.

In yet another aspect, a system for performing identification of a customer by implementing a zero-knowledge membership proof is provided. The system comprises a data owner device, acting as a prover, comprising a database to store identification data containing identities of a plurality of customers therein. The system also comprises a client device, acting as a verifier, configured to provide a query to confirm identities of one or more given customers, from the plurality of customers, from the identification data. Herein, public parameters to be used for computing and verification of proof by the prover and the verifier, respectively, are defined in a setup phase and shared therewith. Further, the prover is configured to compute a commitment using the public parameters for the identities of the plurality of customers, defined as a given ordered set X, and send the commitment to the given ordered set X to the verifier. The verifier is configured to send the query, to the prover, for proving membership of identities of the said one or more given customers defined as a subset S sampled from the said given ordered set X. The prover is further configured to: compute a proof of membership providing that the identities of the said one or more given customers defined in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing elements of the vector $\vec{x}$ that are selected in same position as in the vector $\vec{x}$, and 0 in non-selected positions, based on the defined public parameters, and send the proof of membership to the verifier. The verifier is further configured to verify the proof of membership based on the defined public parameters.

In one or more embodiments, the prover is further configured to update the commitment, using the public parameters, in case of addition of identities of new customers to the identification data.

In one or more embodiments, the inner product proof is defined over an elliptic curve group.

In one or more embodiments, the commitment is a Pedersen commitment.

It is to be appreciated that all the aforementioned implementation forms can be combined. It has to be noted that all devices, elements, circuitry, units, and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity that performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION

In the following description, for purposes of explanation, numerous specific details are set forth in order to provide a thorough understanding of the present disclosure. It will be apparent, however, to one skilled in the art that the present disclosure is not limited to the specific details described herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Unless specified otherwise in the following description, the terms "perform", "calculate", "computer-assisted", "compute", "establish", "generate", "configure", "reconstruct", and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

Moreover, in particular a person skilled in the art, with knowledge of the method claim/method claims, is of course aware of all routine possibilities for realizing products or possibilities for implementation in the prior art, and so there is no need in particular for independent disclosure in the description. In particular, these customary realization variants known to the person skilled in the art can be realized exclusively by hardware components or exclusively by software components. Alternatively and/or additionally, the person skilled in the art, within the scope of his/her expert ability, can choose to the greatest possible extent arbitrary combinations according to embodiments of the invention for hardware components and software components in order to implement realization variants according to embodiments of the invention.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

In cryptography, a zero-knowledge proof or zero-knowledge protocol is a method by which one party (the prover) can prove to another party (the verifier) that a given statement is true while the prover avoids conveying any additional information apart from the fact that the statement is indeed true. The essence of zero-knowledge proofs is that it is trivial to prove that one possesses knowledge of certain information by simply revealing it; the challenge is to prove such possession without revealing the information itself or any additional information. The present disclosure provides a zero-knowledge proof scheme which is applicable for membership proofs. The membership proof is a particular case of zero-knowledge proofs that is implemented for proving membership of a subset sampled from a given set and the correctness of linear operations over the elements of the subset. The membership proof system is privacy-preserving and efficient, and the only information revealed are the results of the operations over the elements of the subset. The proposed proof scheme can be used in any application that requires a linear operation of elements sampled from a bigger set where privacy of the elements of the set is required. For example, in data analysis of private large datasets one can select a subset and compute a linear operation like a sum or an average over the elements of this subset and provide a proof for both correctness of the operation and membership proof of the subset.

The present disclosure provides a proof scheme that, given two ordered sets X and S, proves membership of the elements of the set S in the set X, and further that the elements of the set S satisfy a known linear relation. For embodiments of the present disclosure, since the set X and the set S are ordered sets, those are being considered as vectors. For efficiency, the embodiments of the present disclosure chose to define the proof scheme over a group G where the Discrete Logarithm Assumption is hard (as no efficient method is known for computing them in general), instead of using bilinear groups or other less efficient solutions. Thus, the embodiments of the present disclosure rely on this assumption for security. In practice, the Discrete Logarithm Assumption is an elliptic curve. Further, the embodiments of the present disclosure commit to the values of the set X with the Pedersen vector commitment scheme, and a proof scheme is construed that is zero-knowledge for privacy purposes.

The proposed proof scheme of the present disclosure provides a novel codification of the membership condition. Herein, the Pedersen commitment of the set X is considered as an accumulator, because it aggregates all the values into a single group element. The proposed proof scheme "translate" the technique as described in Papamanthou et al. [See: Charalampos Papamanthou, Roberto Tamassia, and Nikos Triandopoulos, Optimal Verification of Operations on Dynamic Sets, CRYPTO 2011] in bilinear groups by splitting the accumulator into a digest of the subset S and the complementary subset to the present case, where all the elements are defined in the same group. For instance, given an ordered set X of size $|X|=m$ and subset $S \subseteq X$, the proposed proof scheme considers the associated vector $\vec{x}=(x_1, \ldots, x_m) \in \mathbb{Z}_p^m$ and define the vectors $\vec{s} \in \mathbb{Z}_p^m$ in which i-th component is $x_i$ if $x_i \in S$, or 0 otherwise. The proposed proof scheme also consider the vector $\vec{w} \in \mathbb{Z}_p^m$ such that its i-th component is $x_i$ if $x_i \notin S$, or 0 otherwise. Herein, The commitment to X with randomness $r_1$ is $C^X = h^{r_1} \prod_{i=1}^{m} g_i^{x_i}$.

The commitment to S with randomness $r_2$ is $C^S = h^{r_2} \prod_{i=1}^{m} g_i^{s_i} = h^{r_2} \prod_{x_i \in S} g_i^{s_i}$.

The witness of the membership relation is $W = h^{r_1 - r_2} \prod_{i=1}^{m} g_i^{w_i} = h^{r_1 - r_2} \prod_{x_i \notin S} g_i^{s_i}$. The verification of membership consists in checking that $C^X = C^S W$.

For security, the proposed proof scheme is designed without using any trapdoor, hence one cannot use the same hard problem in the security proof. To overcome this difficulty, a new condition is added to ensure that the adversary does not change the values of the set. For instance, an adversary who could combine $x_i$ and $w_i$ such that $s_i + w_i = x_i$, could possibly pass the verification since both are exponents of the same generator $g_i$. To avoid this attack, the proposed proof scheme add the condition that for all i=1, ..., m: $(s_i = x_i$ and $w_i = 0)$ OR $(s_i = 0$ and $w_i = x_i)$. Herein, given that $s_i + w_i = x_i$, the previous condition is equivalent to: $s_i \cdot w_i = 0$.

The proposed proof scheme also codifies the new condition into an inner product by applying Schwarz-Zippel lemma technique. In particular, the proposed proof scheme proves the new condition by proving the inner product $\langle \vec{s}, \vec{w} \cdot \vec{b^m} \rangle = \sum_{i=1}^{m} s_i \cdot w_i \cdot b^i$ is equal to 0, where $\vec{b^m} = (1, b, \ldots, b^{m-1})$ and $b \in \mathbb{Z}_p \setminus \{0\}$ is a challenge sent by the verifier. If such inner product is equal to 0 with b sampled at random, then $s_i \cdot w_i = 0$ for all i=1, ..., m with overwhelming probability by the Schwartz-Zippel lemma.

Further, the proposed proof scheme utilizes results from the combination of the accumulator and the Inner-product proof for proving membership. In particular, the Inner-Product Argument of Bulletproofs presented in Bünz et al. [See: Benedikt Bünz, Jonathan Bootle, Dan Boneh, Andrew Poelstra, Pieter Wuille and Greg Maxwell, Bulletproofs: Short Proofs for Confidential Transactions and More, IEEE SP 2018], hereinafter "Bulletproofs," is used for proving the inner-product condition as a sub-proof of the proposed proof scheme. Herein, the similar techniques of Range proof system as implemented in Bulletproofs are used to provide zero-knowledge in the proposed proof scheme. In particular, the proposed proof scheme utilizes the inner-product argument presented in Bulletproofs for proving the inner-product condition, where the same strategy is applied as in the Range proof system to have zero-knowledge property of the vectors $\vec{s}$ and $\vec{w}$. The proposed proof scheme needs different generators set since the construction given in Bulletproofs do not apply directly because one side of the inner product is committed with one set of generators and the other side of the inner product with another set of generators. Thus, the proposed proof scheme use $g_1, \ldots, g_m$ for $\vec{s}$ and another commitment key $h_1, \ldots, h_m$ to the vector $\vec{w} \in \mathbb{Z}_p^m$.

The proposed proof scheme also optimizes the combination of the accumulator proof with the Range proof to have the minimal proof size and verification equations. For this purpose, the proposed proof scheme proves that the inner product using $C^S$ and W with different sets of generators by relating them with some vector polynomials that contains $\vec{s}$ and $\vec{w}$ hidden. The proposed proof scheme also prove the relation that these vector polynomials have with $C^X$, which results that it is exactly the sum of these vectors. Then, it is not necessary to check $C^X = C^S W$ because it is implicit in the last check.

Furthermore, the proposed proof scheme provides an extension of the discussed proof systems to also prove a linear relation (or multiple linear relations) over elements of the subset with proven membership, with a minimal overhead. Concretely, if n is the size of the subset S, the proposed proof scheme adds 'n' scalar multiplications in the prover complexity and '2n+1' exponentiations in the group in the verifier complexity, both of which would already be linear in the size of the whole set (>>n). The proposed proof scheme may also require one extra challenge from the verifier, while the size of the proof and the public parameters remain the same. For one linear form $L: \mathbb{Z}_p^m \to \mathbb{Z}_p$ the equivalent linear operation $L(\vec{s})=\sum_{i=1}^{m}s_i \cdot L_i$ is written as an inner product $<\vec{s}, \vec{L}>>$ and both conditions ($>\vec{s}, \vec{w}\cdot\vec{b^m}>=0$ and $<\vec{s},\vec{L}>=y$ are used, where y is a public value) together with a challenge z that is another independent variable to group both conditions but ensure that both hold: $>\vec{s}, \vec{w}\cdot\vec{b^m}+\vec{L}\cdot z>=y\cdot z$. Also, for many linear relations with public values $y_1, \ldots, y_m$, the same idea with different powers of the variable z: $>\vec{s}, \vec{w}\cdot\vec{b^m}+\sum_{i=1}^{m}\vec{L_i}\cdot z^i>=\sum_{i=1}^{m}y_i\cdot z^1$ is utilized.

Figure 1:
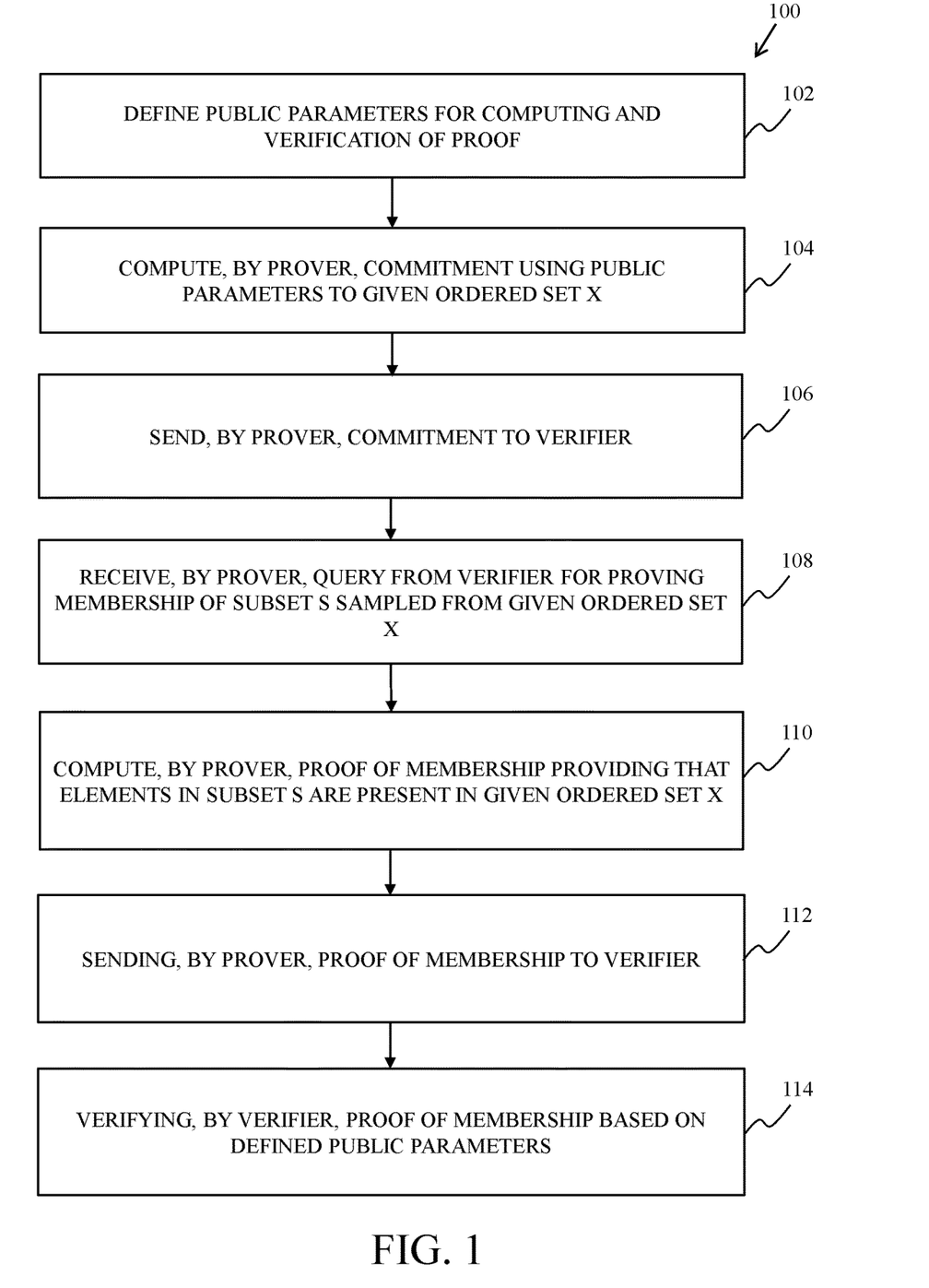
FIG. 1 illustrates a flowchart of a method for providing a zero-knowledge membership proof, in accordance with one or more exemplary embodiments of the present disclosure.

FIG. 1 illustrates an exemplary embodiment of the present disclosure as a flowchart of a method 100 for providing a zero-knowledge membership proof. In general, the present method 100 offers an efficient solution for the objective of proving membership of one or more elements in a given ordered set and for proving correctness of linear operations over the said one or more elements. The present method 100 provides discrete steps involved in implementation of the proposed proof scheme as described in the preceding paragraphs. The method 100 described herein can be implemented in hardware software (e.g., firmware), or a combination thereof. In an exemplary embodiment, the method 100 described herein can be implemented in hardware, and is part of the microprocessor of a special or general-purpose digital computer, such as a personal computer, workstation, minicomputer, or mainframe computer. Herein, the method 100 of FIG. 1 has been described in reference to FIG. 2 and FIG. 3 for better understanding later in the description. Further, the description of FIG. 4 provides a computing environment (as discussed later) in which the method 100 of the present disclosure may be implemented.

At step 102, the method 100 includes defining, in a setup phase, public parameters to be used for computing and verification of proof by a prover and a verifier, respectively. Herein, the setup phase defines the public parameters that the prover and the verifier will use for computing the proof and verifying the proof, respectively. The said public parameters includes the commitment keys to be utilized by the prover and the verifier. The setup phase is run once, before any query is sent. The defined public parameters are thereafter fixed for all the proofs. For example, for present a zero-knowledge membership proof for the following relation:

$$\mathcal{R}_{IP,X} = \left\{ \begin{array}{c} (g, h \in \mathbb{G}^m, h, C^X, C^S, W \in \mathbb{G}; x, s, w \in \mathbb{Z}_q^m, r_1, r_2, r_3 \in \mathbb{Z}_q): \\ C^X = g^x h^{r_1}, C^S = g^s h^{r_2}, W = h^w h^{r_3}, \\ x = s + w, s \cdot w = 0 \end{array} \right\}$$

Herein, the setup may involve: $(g, h) \in \mathbb{G}^m$, $h \in \mathbb{G}$, and returns the commitment key ck=(g, h, h). Further, it is considered that $C^X$ is fixed in advance and many proofs for different subsets S use the same $C^X$ and the same commitment key (or, in other words, same setup generators).

It may be understood that the above relation $\mathcal{R}_{IP,X}$ basically describes the relation that is to be proved. Herein, IP stands for Inner Product since the scheme uses the IP proof of Bulletproofs, X is the set that represents the data and is something fixed, the commitment of X, $C^X$, is an element in an elliptic curve that is used as an encryption of the values in X that perfectly hides them, and holds the property of uniqueness (there is no other set of values different of X that would produce the same $C^X$). The rest of the elements listed in the parenthesis are those produced in the proof, where the public elements are listed first (after the ";") and are secret (just known to the prover). After the colon (:), there are the relations between the elements that express exactly what to be proved, that the values in S represented by the vector $\vec{s}$ are also in X represented by the vector $\vec{x}$, both with the same length but $\vec{s}$ contains the values of $\vec{x}$ that are selected in the same position as in $\vec{x}$, and 0 in the rest of positions (as will be discussed later in more detail). The vector $\vec{w}$ has the complementary elements of $\vec{s}$, so it has the values of $\vec{x}$ that are not selected in $\vec{s}$ in the same positions as in $\vec{x}$, and 0 in the rest of positions. The equations x=w+s and s*w=0 imply this. The other elements, $C^X$, $C^S$, W are commitments (encryption with the properties as described) of $\vec{x}$, $\vec{s}$ and $\vec{w}$ respectively.

Further, the polynomials l(X), r(X) are vectors of length as $\vec{x}$, that contain the secret values (x,s,w) along with powers of X (the variable of polynomial, independent of vector $\vec{x}$), and is strategically positioned to produce the equations in the relation (x=w+s and s*w=0) when the inner product of those is computed (noted by <l(x), r(x)>), that is the polynomial t(X). l(X) and r(X) also contain the vectors $s_L$ and $s_R$ that are values randomly chosen to hide the rest of the polynomial, so that zero-knowledge property is maintained even if l(X) and r(X) are revealed.

At step 104, the method 100 includes computing, by the prover, a commitment using the public parameters to a given ordered set X. In particular, the prover computes a commitment using the public parameters to claim knowledge of elements of the given ordered set X. Herein, the prover may claim the statement about the relation to be proved, which is, that the prover claims to know the sets X and S and, that S is a subset of X. It is to be noted that the sets X and S are not revealed to the verifier, at any stage. For this purpose, in the present example, the prover computes the commitments $C^S$, W with respectively randomness $r_2, r_3 \leftarrow \mathbb{Z}_q$ sampled at random. The prover samples at random the blinding factors $s_L, s_R \leftarrow \mathbb{Z}_q^m$ and the rest of the randomness $\rho, \rho' \leftarrow \mathbb{Z}_q$ and computes the commitment of the blinding factors $B=g^{s_L}h^{s_R}h^{\rho}$. It may be understood that the prover creates the first messages where it commits to the secret values. This is done to prevent the prover changing the values after the execution of next steps. In the present embodiments, commitment is a Pedersen commitment. That is, the commitment to the given ordered set X is computed by the prover by implementing the Pedersen commitment scheme. Herein, the Pedersen commitment of the set X is considered as an accumulator, because it aggregates all the values into a single group element.

In case of addition of new elements to the given ordered set X, the method 100 further includes updating the commitment using the public parameters. In the present examples, the commitment $C^X$ is updated by changing value $x_i$ by $x_i'$, $(C^X)'=C^X \cdot g_i^{-x_i+x_i'}$, or adding a new value $(C^X)'=C^X \cdot g_{m+1}^{x_{m+1}}$ where $g_{m+1}$ is a generator that has not been used before (consider new size m'=m+1). The new generator is provided by the setup to the prover and verifier.

At step 106, the method 100 includes sending, by the prover, the commitment to the ordered set X to the verifier. Further, at step 108, the method 100 includes receiving, by the prover, a query from the verifier for proving membership of a subset S sampled from the given ordered set X. That is, the query requests for sampling a subset S from the given ordered set X. Herein, the prover sends $C^S$, W, B to the verifier as a first message of the proof. The verifier receives the first message from the prover and save such first message. Herein, the verifier samples $b \leftarrow \mathbb{Z}_q$ at random and sends it to the prover. It may be contemplated that the messages may be exchanged between the prover and the verifier until the last response of the verifier. At each stage, the prover combines its secret values with the random values received from the verifier, and produces the next messages to be sent to the verifier. The prover may then use this value of the verifier to create some vectors and polynomials, as discussed hereinafter.

At step 110, the method 100 includes computing, by the prover, a proof of membership providing that elements in the subset S represented by a vector $\vec{s}$ are present in the given ordered set X represented by a vector $\vec{x}$, with the vector $\vec{s}$ and the vector $\vec{x}$ being of same length and the vectors $\vec{s}$ containing elements of the vector $\vec{x}$ that are selected in same position as in the vector $\vec{x}$, and 0 in non-selected positions, based, at least in part, on the defined public parameters. That is, the verifier receives the last message from the prover and uses all the received information to check the verification equations, and decide if it accepts the proof or not. Herein, computing the proof of membership involves computing the commitment of the vector $\vec{s}$, its complementary, some polynomials, an inner product of the polynomials and a proof for the polynomials, and providing that the inner product is correctly computed (i.e., a proof of the inner product). If all the equations hold, the verifier accepts the proof which means it can be sure that the claim in the statement is true, otherwise it does not accept the proof. In some examples, the verifier's output is defined to be 0/1 for rejecting/accepting the proof, respectively.

For this purpose, in the present example, the prover computes the vector $b'''=(1, \ldots, b^{m-1}) \in \mathbb{Z}_q^m$ and defines the following polynomials:

$$l(X) = s - xX^2 + 1^m zX + s_L X^3 \in \mathbb{Z}_q^m[X]$$

$$r(X) = b^m \circ (1^m z(1 + X^2) + wX + s_R X^3) \in \mathbb{Z}_q^m[X]$$

$$t(X) = \langle l(X), r(X) \rangle = \sum_{i=0}^{6} t_i X^i$$

At step 112, the method 100 includes sending, by the prover, the proof of membership to the verifier. In particular, the prover sends the commitment to $\vec{s}$, the vector representing the complementary subset, some polynomials, including the inner product and the proof of the inner product. Herein, the prover samples $\tau_0, \tau_3, \tau_4, \tau_5, \tau_6 \leftarrow \mathbb{Z}_q$ at random and commits to $t_0, t_3, t_4, t_5, t_6: T_i = g^{t_i} h^{\tau_i}$ for i=0,3,4,5,6 and sends these commitments to the verifier. Then, the verifier, at its end, samples $x \leftarrow \mathbb{Z}_q$ at random and sends it to the prover. And then, the prover evaluates the polynomials at x,l=l(x), r=r(x), computes $\hat{t}=t(x)=\langle l, r \rangle$, $\mu = r_2 + r_3 x - r_1 x^2 + \rho x^3$, $\tau_x = \Sigma_{i=0, \neq 1, 2}^{6} \tau_i x^i$ and $P=g^l h^r$. Further, the prover sends to the verifier P, $\hat{t}$, $\mu$, $\tau_x$ and runs the inner-product argument with (P, $\hat{t}$) to prove that $\hat{t} = \langle l, r \rangle$ such that $P=g^l h^r$.

At step 114, the method 100 includes verifying, by the verifier, the inner product based on the defined public parameters and the proof of the inner product. For this purpose, the verifier switches generators of the commitment from h to h'=$h^{b^{-m}}$, so now W is a commitment to $b^m \cdot w$, B a commitment to $(s_L, b^m \cdot s_R)$ and P a commitment to $(l, b^m \cdot r)$. Herein, the verifier does the following checks:

1 $g^{\hat{t}} h^{\tau_x} g \langle 1^m, b^m \rangle^{z^2 x} \cdot \Pi_{i=0, \neq 1, 2}^{6} T_i^{x^i}$ 2 $h^\mu \cdot P \cdot (C^X)^{x^2} \cdot C^S \cdot W^x \cdot g^{1^m z x} \cdot h^{b^m z(1+x^2)} \cdot B^{x^3}$, and 3 Inner-product verification argument for $\hat{t}$ and P.

Herein, the first check ensures that the shape of the polynomial t(X) is correct (i.e., it contains the coefficients committed in the elements $T_0, T_3, T_4, T_5, T_6$). The second check ensures that the vectors l(X) and r(X) contain the secret values and the randomness as they should do by operating with the commitments of the secret values, not the values directly (i.e., basically check the definition of l(X), r(X) but in the exponent). The third check ensures that $\hat{t}$ being the inner product of 1 and r is correct and it fits with t(X).

Further, as discussed, the present method 100 in addition to offering an efficient solution for the objective of proving membership of one or more elements in a given ordered set, also provides proof for correctness of linear operations over the said one or more elements. For this purpose, the prover, using the commitment, further claims to have computed a correct result for each of one or more linear operations performed over elements of the subset S. Further, the query, received by the prover, from the verifier, further comprises a request for value Y resultant of a given linear operation performed over elements of the subset S. That is, the present method 100 also provides an extension of the above described scheme, where the claim of the prover is the knowledge of the same sets (X, S) such that S is a subset of X and, additionally, the prover claims that the value Y is the result of a linear function of the values in the set S (e.g., the sum of the values in the set S, or the average of the values in the set S, or any other linear function). This is also extended to more than one linear function, a general case of k linear operations of the values of the set S (additionally to the S being a subset of X). It may be understood that in any case, the information (elements) of the set X and the set S is not revealed, and it is protected by the Zero-knowledge property of the proposed scheme, and the only information about the secrets that is revealed are the results of the operations.

Considering a similar example as discussed in the preceding paragraphs, a zero-knowledge proof system is presented for the following relation:

$$\mathcal{R}_{IP,L} = \left\{ \begin{array}{l} (g, h \in \mathbb{G}^m, h, C^X, C^S, W \in \mathbb{G}, L \in \mathbb{Z}^m, y \in \mathbb{Z}_q; \\ x, s, w \in \mathbb{Z}_q^m, r_1, r_2, r_3 \in \mathbb{Z}_q): \\ C^X = g^x h^{r_1}, C^S = g^s h^{r_2}, W = h^w h^{r_3}, \\ x = s + w, s \cdot w = 0, L(s) = y \end{array} \right\}$$

where L is a public linear form and y is a public scalar. Herein, it is again considered that $C^X$ is fixed in advance. Further, the same setup as discussed above is implemented. The interactive scheme is also same as implemented above, with some changes made for proving correctness of the linear operation(s) over the element(s) of the subset S. In general, the method 100 includes adding, by the prover, a matrix representative of the given linear operation to be performed over elements of the subset S to modify polynomials used to compute the inner product. Further, the method 100 includes checking, by the verifier, for the modified polynomials while verifying the inner product (as well as the commitments in the proof of membership). It may be understood that the security of the proposed proof scheme as per the method 100 relies on Discrete Logarithmic (DLOG) assumption and there is no known DLOG relation among the generators in the commitment key.

Herein, in the relation $\mathcal{R}_{IP,L}$, L is for the linear operation applied to the vector $\vec{s}$ representing the subset S of the set X. The structure of this relation is the same as discussed above for the $\mathcal{R}_{IP,X}$, with L and y are added in the list of public information, wherein y is the result of the operation L. Further, L(s)=y is added as it represents the linear operation over the elements of the vector $\vec{s}$. Thereby, the operation L is concretely represented with a matrix that is also called as L herein for simplicity and L(s) is actually a multiplication of the matrix L with the operations by the vector $\vec{s}$.

In particular, for extension of the proposed scheme for proving correctness of a single given linear operation over the element(s) of the subset S,
In the prover side, the polynomial r(X) is modified to:

$$r(X)=b^m \cdot (1^m z(1+X^2)+wX+s_R X^3)+LX \in \mathbb{Z}_q^m [X].$$

And, in the verifier side, the checks 1 and 2 (as discussed above) are modified to:

1 $g^{\hat{r}} h^{\tau_x} \hat{2} g (1^m, b^m)^{z^2 x + yx} \cdot \prod_{i=0,\neq 1,2}^{6} T_i^{x^i}$, and
2 $h^\mu \cdot P \cdot (C^X)^{x^2} \hat{=} C^S \cdot W^x \cdot g^{1^m zx} \cdot h^{b^m z(1+x^2)+Lx} \cdot B^{x^3}$.

On the other hand, for extension of the proposed scheme for proving correctness of multiple given linear operations over the element(s) of the subset S,
In the prover side, the polynomial r(X) is modified to:

$$r(X)=b^m \cdot (1^m z(1+X^2)+wX+s_R X^3)+(L_1 L_2 z + L_3 z^2 + \ldots$$
$$L_k z^k)X \in \mathbb{Z}_q^m [X].$$

And, in the verifier side, the checks 1 and 2 (as discussed above) are modified to:

1. $g^{\hat{r}} h^{\tau_x} \stackrel{?}{=} g^{(1^m, b^m) z^2 x + (\sum z^i \cdot y^i) x} \cdot \prod_{i=0,\neq 1,2}^{6} T_i^{x^i}$ 2. $h^\mu \cdot P \cdot (C^X)^{x^2} \stackrel{?}{=} C^S \cdot W^x \cdot g^{1^m zx} \cdot h^{b^m z(1+x^2)+(\sum z^i \cdot L_i)x} \cdot B^{x^3}$ Now, since there is a new equation with matrix L, this is added in the polynomial vector r(x) to produce L(s) once the inner product of l(x) and r(x) are computed. Then, it should also be checked by the verifier that the result is y, so that it is added in the above equation 1 in the exponent with the same power of X as L(s) has (which is 1). Further, the equation 2 of the verifier that checks whether the vectors l and r have the correct shape, Lx is added.

Figure 2:
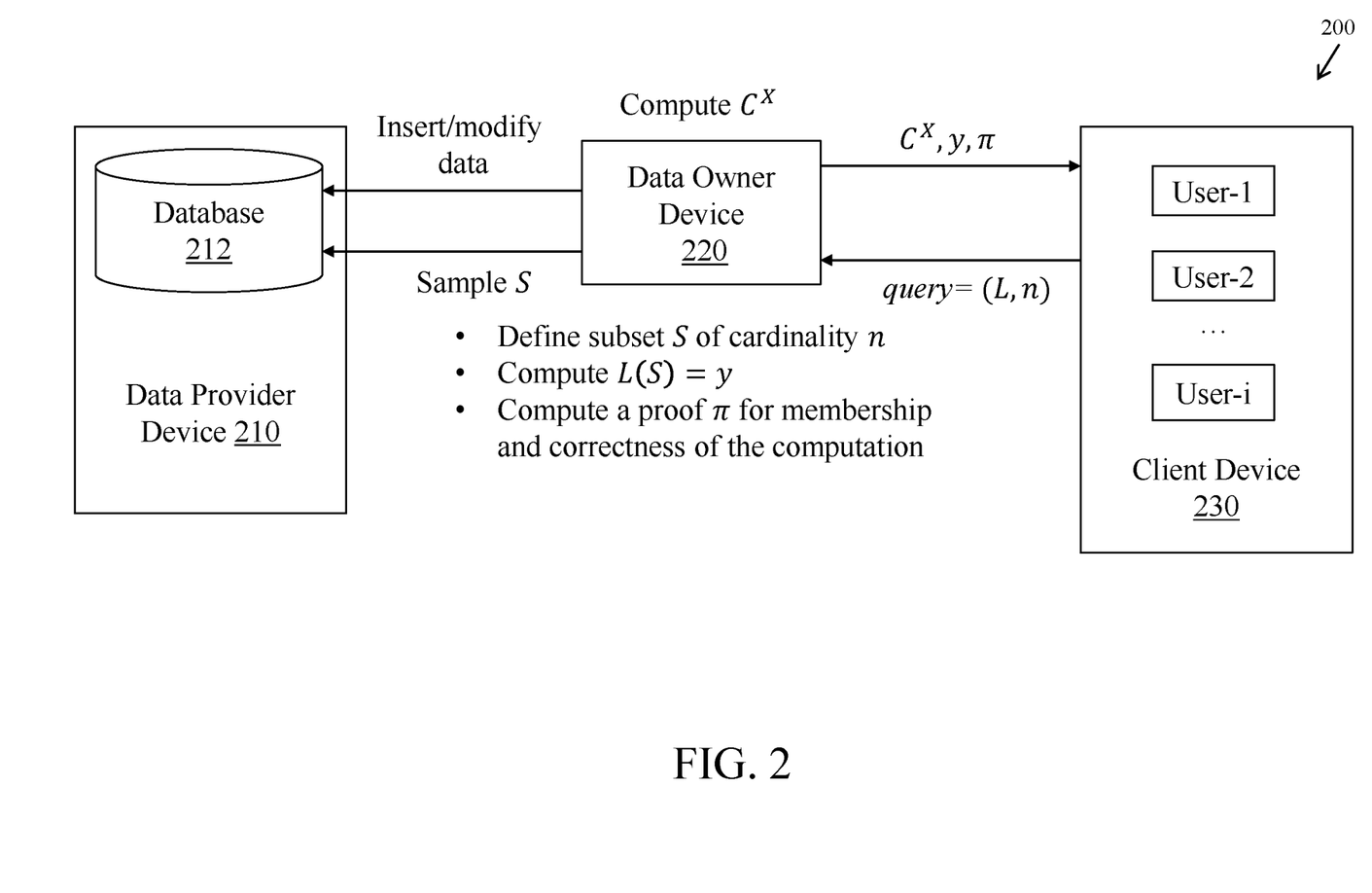
FIG. 2 illustrates a schematic diagram of a system for performing data analysis on private data by implementing a zero-knowledge membership proof, in accordance with one or more exemplary embodiments of the present disclosure.

Referring to FIG. 2, illustrated is a schematic diagram of a system (as represented by reference numeral 200) for performing data analysis on private data by implementing a zero-knowledge membership proof, in accordance with one or more exemplary embodiments of the present disclosure. The various embodiments and variants disclosed above apply mutatis mutandis to the present system 200 without any limitations.

As shown, the system 200 includes a data provider device 210 for providing private data which is to be used for processing the query. Herein, the data provider device 210 may include a database 212 configured to store the private data therein. For purposes of the present disclosure, it is considered that the private data is an ordered set X. The system 200 also includes a data owner device 220, acting as a prover (with the two terms being interchangeably used herein). The data owner device 220 is configured to access and process the private data from the database 212. The data owner device 220 also receives queries from the clients with operations and the number of values that it should use to perform the computations (as discussed later). The system 200 further includes a client device 230, acting as a verifier (with the two terms being interchangeably used herein). The client device 230 is configured to provide a query related to a group of elements of the private data for performing data analysis therefor. Herein, the client device 230 is the party who wants to analyze the private data, and thus sends a query to the data owner device 220 with the number of elements to perform the operation (n) and the operation (L). It may be understood that the system 200 may include multiple users as part of the client device 220 (as illustrated), which may provide same or different queries (as will be discussed later in the description).

In the system 200, public parameters to be used for computing and verification of proof by the prover 220 and the verifier 230, respectively, are defined in a setup phase and shared therewith (as discussed in reference to the method 100). Herein, the prover 220 is configured to compute a commitment using the public parameters to claim knowledge of elements of the private data, defined as a given ordered set X. In the present embodiments, the prover 220 is further configured to update the commitment, using the public parameters, in case of addition of new elements to the private data. That is, the prover 220 updates the commitment $C^X$ with the new value and distributes $C^X$ to all the users in the verifier 230. In particular, the prover 220, by systematically implementing a way of regular intervals, defines the subset S of cardinality n≤m. Herein, the prover 220 further performs the operation L over the values of S. Further, the prover 220 is configured to send the commitment to the verifier 230. The verifier 230 is configured to send the query, to the prover 220, for proving membership of the said group of elements defined as a subset S sampled from the said given ordered set X. The prover 220 is further configured to compute a proof of membership providing that the group of elements in the subset S represented by a vector $\vec{s}$ are present in the given ordered set X represented by a vector $\vec{x}$ with the vector $\vec{s}$ and the vector $\vec{x}$ being of same length and the vector $\vec{s}$ containing the group of elements of the vector $\vec{x}$ that are selected in same position as in the vector $\vec{x}$, and 0 in non-selected positions, based on the defined public parameters. Herein, the proof of membership includes commitments of the secret elements, polynomials that codify them and an inner product of the polynomials. The prover also computes a proof for the correctness of these polynomials, commitments and the inner product. In particular, the prover 220 defines the subset S of cardinality n sampled with regular intervals from set X, computes L(S)=y and a proof π for membership and correctness of the computation answers with the result y and the proof π. The prover 220 is also configured to send the inner product and the proof of the inner product to the verifier 230. The verifier 230 is further configured to verify the inner product based on the defined public parameters and the proof of the inner product. The verifier 230 can verify that the result is correct using the proof received from the prover 220.

In the present embodiments, the prover 220, using the commitment, further claims to have computed a correct result for each of one or more linear operations performed over elements of the subset S. Herein, the query, received by the prover 220, from the verifier 230, further comprises a request for value Y resultant of a given linear operation performed over elements of the subset S. In such case, the prover 220 is configured to add a matrix representative of the given linear operation to be performed over elements of the subset S to modify polynomials used to compute the inner product. Further, the verifier 230 is configured to check for the modified polynomials while verifying the inner product. Herein, the verifier 230 is also configured to check that the commitments of the proof are correctly computed.

In a use-case, the system 200 may be implemented for data analysis for estimating some operation over a population with a sample without revealing nothing more about the data beyond the result of the operation. An example of its application is the estimation of the mean of a population, which can be done by a sum and then, the result is multiplied by the inverse of n. Herein, the system 200 for analyzing the private dataset X of population may have a client (user/verifier) querying with a linear operation that is to be performed over n<<|X| values of X. In a systematic way of regular intervals, the data owner device 220 selects these elements to define the subset S and computes the linear operation over those elements. Then, the data owner device 220 computes and provides a proof following the proposed scheme to prove membership of S in X and correctness of the linear operation.

Figure 3:
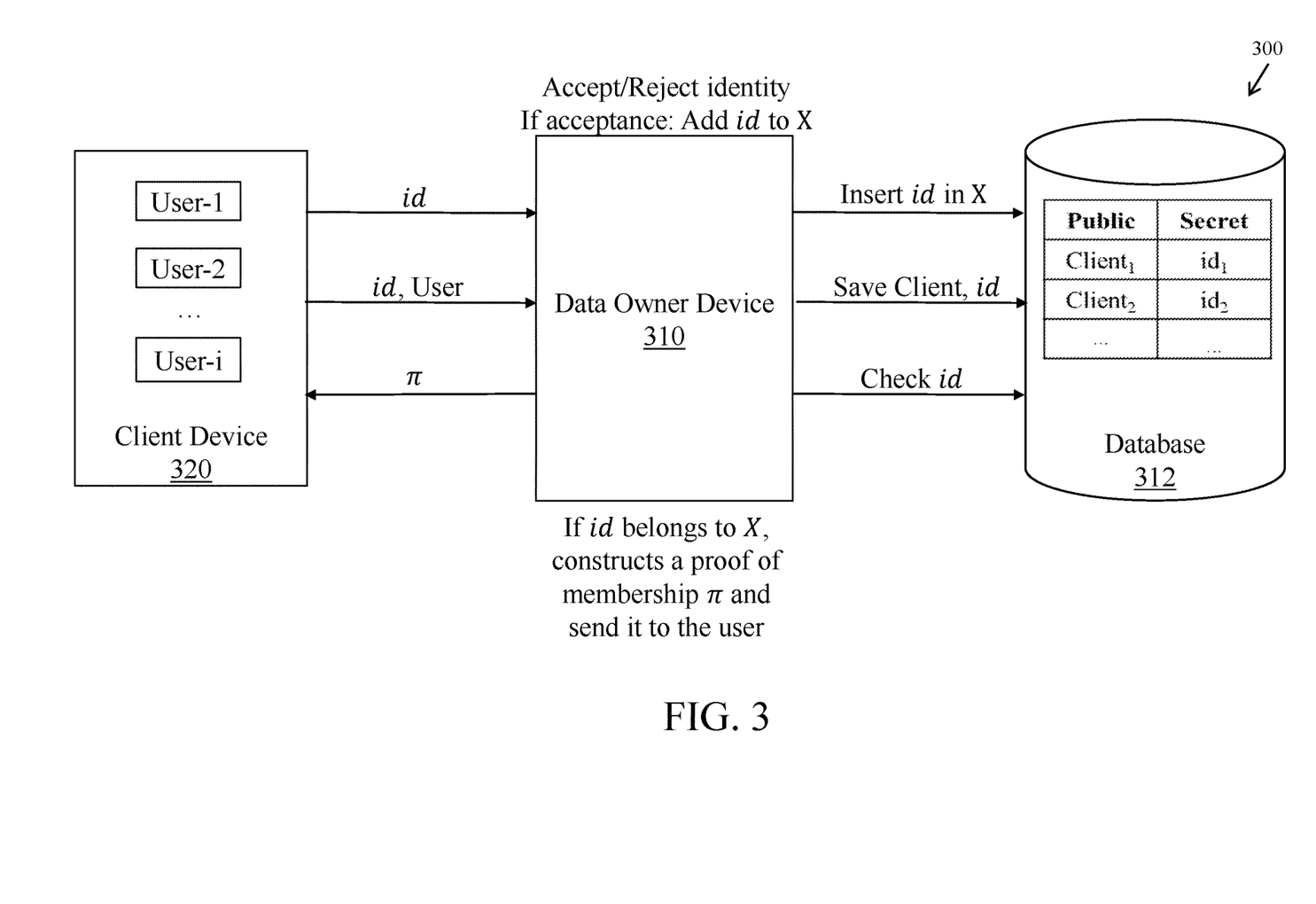
FIG. 3 illustrates a schematic diagram of a system for performing identification of a customer by implementing a zero-knowledge membership proof, in accordance with one or more exemplary embodiments of the present disclosure.
Figure 4:
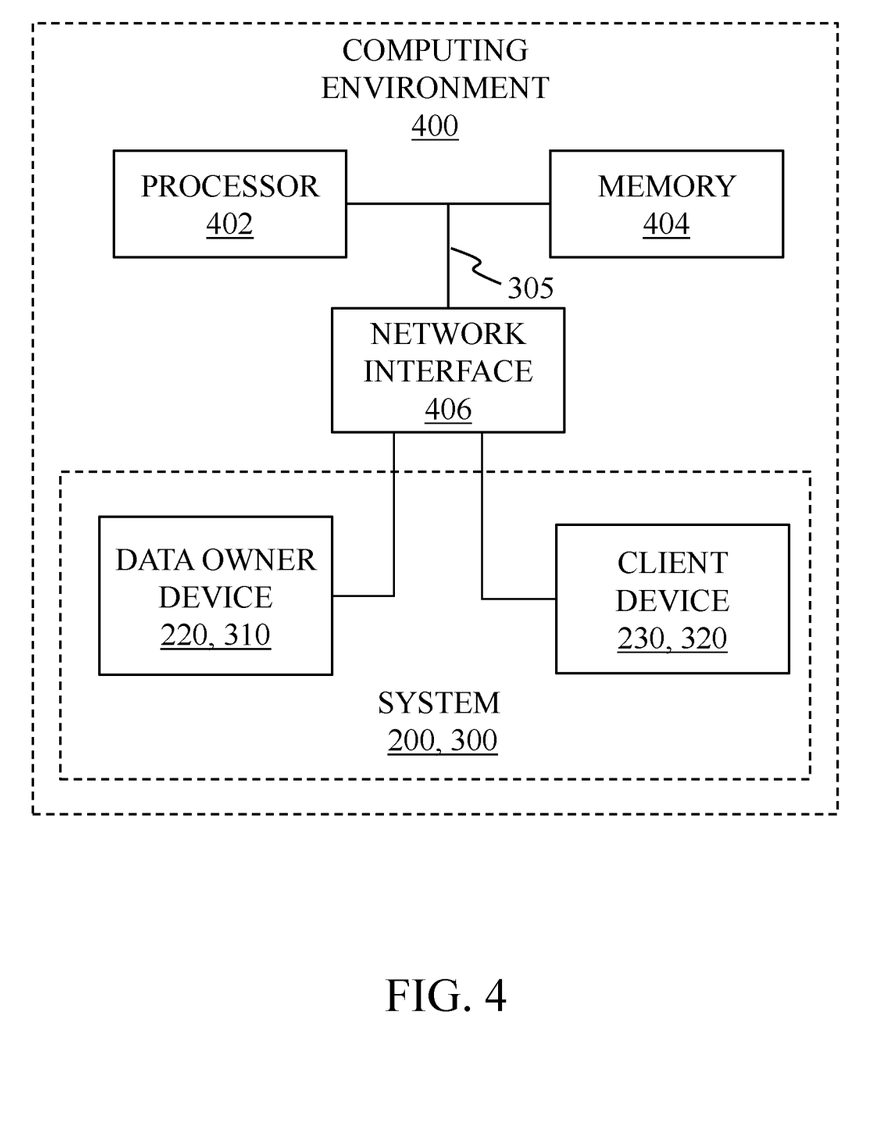
FIG. 4 illustrates a schematic diagram of a computing environment in which the system of FIG. 2 and/or the system of FIG. 3 are implemented, in accordance with one or more exemplary embodiments of the present disclosure.

Referring to FIG. 3, illustrated is a schematic diagram of a system (as represented by reference numeral 300) for performing identification of a customer by implementing a zero-knowledge membership proof, in accordance with one or more exemplary embodiments of the present disclosure. The various embodiments and variants disclosed above apply mutatis mutandis to the present system 300 without any limitations.

As shown, the system 300 includes a data owner device 310 for providing private data which is to be used for processing the query. Herein, the data owner device 310 may include a database 312 configured to store identification data containing identities of a plurality of customers therein, and modify the identification data as required. For purposes of the present disclosure, it is considered that the identification data is an ordered set X. Herein, the data owner device 310 acts as a prover (with the two terms being interchangeably used herein). The data owner device 310 receives queries to confirm identities of one or more given customers, from the plurality of customers, from the identification data (as discussed later). In general, the data owner device 310 is the party who has a rule for accept/reject identities and stores those that are accepted, and also receives queries asking to provide an identification proof to some user. The system 300 further includes a client device 320, acting as a verifier (with the two terms being interchangeably used herein). The client device 320 is configured to provide a query to confirm identities of one or more given customers, from the plurality of customers, from the identification data. Herein, the client device 320 is the party who wants to provide a proof to a user for proving it belongs to the set of accepted identities without revealing the actual identity. It may be understood that the system 300 may include multiple users as part of the client device 310 (as illustrated), which may provide same or different queries (as will be discussed later in the description). Herein, the user is the party who wants to know if the identity of a customer (public identity) is an accepted identity.

In the system 300, public parameters to be used for computing and verification of proof by the prover 310 and the verifier 320, respectively, are defined in a setup phase and shared therewith (as discussed in reference to the method 100). Herein, the prover 310 is configured to compute a commitment using the public parameters for the identities of the plurality of customers, defined as a given ordered set X. In the present embodiments, the prover 310 is further configured to update the commitment, using the public parameters, in case of addition of identities of new customers to the identification data. That is, the prover 310 updates the commitment $C^X$ with the new identification and distributes $C^X$ to all the users in the verifier 320. In particular, the prover 310, by systematically implementing a way of regular intervals, defines the subset S of cardinality n≤m. Herein, the prover 310 further performs the operation L over the values of S. Further, the prover 310 is configured to send the commitment to the verifier 320. The verifier 320 is configured to send the query, to the prover 310, for proving membership of identities of the said one or more given customers defined as a subset S sampled from the said given ordered set X. The prover 310 is further configured to compute a proof of membership providing that the identities of the said one or more given customers defined in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing elements of the vector $\vec{x}$ that are selected in same position as in the vector $\vec{x}$, and 0 in non-selected positions, based on the defined public parameters. That is, the prover 310 defines the subset S of cardinality n sampled with regular intervals from set X, computes a proof for membership of id in X and a proof π for membership and correctness of the computation answers with the result y and the proof π. The prover 310 is also configured to send the proof of membership to the verifier 320, or otherwise send an empty proof to the verifier 320. The verifier 320 is further configured to verify the proof of membership using the defined public parameters. The verifier 320 can verify that the result is correct using the proof of membership received from the prover 310.

In an illustrative use-case, the system 300 may be implemented for financial identification, such as for Know Your Client application (KYC) in finance where an individual or a company wants to identify itself as an accepted/legitimate identity without revealing the actual identity. Herein, the data owner device 310 has a rule for accepting/rejecting identities and stores those that are accepted. The data owner device 310 also receives queries from the clients asking to provide an identification proof to some user. When receiving an identity and some information of it, the data owner device 310 reads the database 312; if the identity is not stored, applies the rule; and decides if to accept or reject the identity. In case of acceptance, the data owner device 310 inserts the new identity to the set X and updates the commitment $C^X$. On the other hand, when receiving a query with an identity and a user, the data owner device 310 reads the database 312; and if the identity is stored in the accepted identities set, computes a proof for membership. The data owner device 310 then sends the proof to the user.

FIG. 4 illustrates a block diagram of a computing environment 400 in which the system 200, 300 of the present disclosure may be implemented, in accordance with one or more exemplary embodiments of the present disclosure. In an embodiment, as discussed, the computing environment 400 may be the computing device on which the system 200, 300 may be executed, with the two terms being interchangeably used hereinafter. In particular, the system 200, 300 may reside on or may be executed by one or multiple computing devices (such as the computing environment 400). The computing device 400 includes a processor 402, a memory 404, and a network interface 406. The computing device 400 helps with execution of operations of the data owner device 220, 310 and the client device 230, 320 of the system 200, 300. Examples of computing device 400 may include, but are not limited to, a personal computer(s), a laptop computer(s), mobile computing device(s), a server computer, a series of server computers, a mainframe computer(s), or a computing cloud(s). In general, the "computing device" in connection with embodiments of the present may be understood to mean for example a computer or a computer system, a client, a smartphone, a device or a server that are in each case arranged outside the blockchain or are not participants in the distributed database (for example the blockchain) (that is to say do not perform operations with the distributed database or only query it without however performing transactions, inserting data blocks or calculating proof of work). As an alternative, the computing device 400 may also in particular be understood to mean a node of the distributed database (as explained later in the description).

In certain implementations, the computing device 400 may be a physical or virtual device. In many implementations, the computing device 400 may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

In an example, the computing device 400 may be configured to run a computer-program product programmed for performing the said purpose. In another example, the computing device 400 may be a non-transitory computer readable medium on which program code sections of a computer program are saved, the program code sections being loadable into and/or executable in a system to make the system execute the steps for performing the said purpose. The computing device 400 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device 400 can be implemented in a single chip. The system of the present disclosure as discussed in the preceding paragraphs may include or be embodied in the computing device 400. It may be appreciated that the two systems (and the corresponding components/elements) may be equivalent for the purposes of the present disclosure.

In one embodiment, the computing device 400 includes a communication mechanism 405 (such as a bus 405) for passing information among the components of the computing device 400. Herein, in particular, the processor 402 has connectivity to the bus 405 to execute instructions and process information stored in the memory 404. The processor 402 may include one or more processing cores with each core configured to perform independently. A multi-core processor enables multiprocessing within a single physical package. Examples of a multi-core processor include two, four, eight, or greater numbers of processing cores. Alternatively, or in addition, the processor 402 may include one or more microprocessors configured in tandem via the bus 405 to enable independent execution of instructions, pipelining, and multithreading. The processor 402 may also be accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 402. Similarly, an ASIC can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 402 refers to a computational element that is configured to respond to and process instructions that drive the system 200, 300. The processor 402 may cause the data management module 104 and the query execution and verification module 106 to perform their respective functions as described. In operation, the processor 402 is configured to perform all the operations of the system 200, 300. Examples of implementation of the processor 402 may include, but is not limited to, a central processing unit (CPU), a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor 402 may refer to one or more individual processors, processing devices and various elements associated with a processing device that may be shared by other processing devices.

The memory 404 refers to a storage medium, in which the data or software may be stored. The memory 404 includes both dynamic memory (e.g., RAM, magnetic disk, writable optical disk, etc.) and static memory (e.g., ROM, CD-ROM, etc.) for storing executable instructions that when executed perform the method steps described herein for writing and retrieval of data in a distributed ledger. In particular, the memory 404 includes a module arrangement to perform steps for writing and retrieval of data in a distributed ledger. The memory 404 also stores the data associated with or generated by the execution of the inventive steps. For example, the memory 404 may store the instructions that drives the system 200, 300. Examples of implementation of the memory 404 may include, but are not limited to, Electrically Erasable Programmable Read-Only Memory (EEPROM), Read Only Memory (ROM), Hard Disk Drive (HDD), Solid-State Drive (SSD), and/or CPU cache memory.

Herein, the memory 404 may be volatile memory and/or non-volatile memory. The memory 404 may be coupled for communication with the processor 402. The processor 402 may execute instructions and/or code stored in the memory 404. A variety of computer-readable storage media may be stored in and accessed from the memory 404. The memory 404 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In some implementations, the instruction sets and subroutines of the system 200, 300, which may be stored on a storage device, such as a storage device coupled to computer, may be executed by one or more processors and one or more memory architectures included within computer. In some implementations, one or more storage devices may include but are not limited to: hard disk drives; flash drives, tape drives; optical drives; RAID arrays; random access memories (RAM); and read-only memories (ROM). Examples of user devices (and/or computer) may include, but are not limited to, a personal computer, a laptop computer, a smart/data-enabled, cellular phone, a notebook computer, a tablet, a server, a television, a smart television, a media capturing device, and a dedicated network device.

In some implementations, the computing device 400 may include a data store, such as a database (e.g., relational database, object-oriented database, triple store database, etc.) and may be located within any suitable memory location, such as storage device coupled to computer. In some implementations, data, metadata, information, etc. described throughout the present disclosure may be stored in the data store. In some implementations, computer may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, the system 200, 300 may be a component of the data store, a standalone application that interfaces with the above noted data store and/or an applet/application that is accessed via client applications. In some implementations, the above noted data store may be, in whole or in part, distributed in a cloud computing topology. In this way, computer and storage device may refer to multiple devices, which may also be distributed throughout the network.

In some implementations, the computing device 400 may execute an application for writing and retrieval of data in a distributed ledger, as described later in the description. In some implementations, the system 200, 300 and/or application may be accessed via one or more of client applications. In some implementations, the system 200, 300 may be a standalone application, or may be an applet/application/script/extension that may interact with and/or be executed within an application, a component of application and/or one or more of client applications. In some implementations, the application may be a standalone application, or may be an applet/application/script/extension that may interact with and/or be executed within the system 200, 300, a component of the system 200, 300, and/or one or more of client applications. In some implementations, one or more of client applications may be a standalone application, or may be an applet/application/script/extension that may interact with and/or be executed within and/or be a component of the system 200, 300 and/or application. Examples of client applications may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications which may be stored on storage devices coupled to user devices may be executed by one or more processors and one or more memory architectures incorporated into user devices.

In some implementations, one or more of client applications may be configured to effectuate some or all of the functionality of the system 200, 300 (and vice versa). Accordingly, in some implementations, the system 200, 300 may be a purely server-side application, a purely client-side application, or a hybrid server-side/client-side application that is cooperatively executed by one or more of client applications and/or the system 200, 300.

In some implementations, one or more of client applications may be configured to effectuate some or all of the functionality of application (and vice versa). Accordingly, in some implementations, application may be a purely server-side application, a purely client-side application, or a hybrid server-side/client-side application that is cooperatively executed by one or more of client applications and/or application. As one or more of client applications the system 200, 300, and application taken singly or in any combination, may effectuate some or all of the same functionality, any description of effectuating such functionality via one or more of client applications the system 200, 300, application or combination thereof, and any described interaction(s) between one or more of client applications the system 200, 300, application or combination thereof to effectuate such functionality, should be taken as an example only and not to limit the scope of the disclosure.

In some implementations, one or more of users may access the system 200, 300 (e.g., using one or more of user devices) directly through the network. In some implementations, the network may be connected to one or more secondary networks, examples of which may include but are not limited to: a local area network; a wide area network; or an intranet, for example. In some implementations, the computing device 400 may be connected to the network through secondary network with phantom link line.

The network interface 406 includes suitable logic, circuitry, and interfaces that may be configured to communicate with one or more external devices, such as a server or another computing device. Examples of the network interface 406 may include, but is not limited to, an antenna, a network interface card (NIC), a transceiver, one or more amplifiers, one or more oscillators, a digital signal processor, and/or a coder-decoder (CODEC) chipset.

In some implementations, the various user devices may be directly or indirectly coupled to the network. For example, user device may be directly coupled to the network via a hardwired network connection. Alternatively, user device may be wirelessly coupled to the network via wireless communication channel established between user device and wireless access point (i.e., WAP) which in turn may be directly coupled to the network. WAP may be, for example, an IEEE 802.11a, 802.11b, 802.11g, 802.11ac, 802.11ae, Wi-Fi®, RFID, and/or Bluetooth™ (including Bluetooth™ Low Energy) device that is capable of establishing wireless communication channel between user device and WAP. In other examples, user device may be wirelessly coupled to the network via wireless communication channel established between user device and cellular network/bridge which may be directly coupled to the network. User devices may execute an operating system, examples of which may include but are not limited to, Android®, Apple® iOS®, Mac® OS X®; Red Hat® Linux®, or a custom operating system.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that enables, e.g., mobile phones, computers, smart phones, and other electronic devices to be interconnected using a short-range wireless connection. Other forms of interconnection (e.g., Near Field Communication (NFC)) may also be used.

It is to be understood that the system and computer-assisted method described herein may be implemented in various forms of hardware, software, firmware, special purpose processors, or a combination thereof. "Computer-assisted" in connection with embodiments of the present disclosure may be understood to mean for example an implementation of the method in which in particular a processor executes at least one method step of the method. One or more of the present embodiments may take a form of a computer program product comprising program modules accessible from computer-usable or computer-readable medium storing program code for use by or in connection with one or more computers, processors, or instruction execution system. A "module" or a "sub-module" in connection with embodiments of the invention may be understood to mean for example a processor and/or a storage unit for storing program commands. By way of example, the processor 402 is specifically configured so as to execute the program commands such that the processor 402 executes functions in order to implement or perform the method according to embodiments of the invention or a step of the method according to embodiments of the invention. For the purpose of this description, a computer-usable or computer-readable medium can be any apparatus that can contain, store, communicate, propagate, or transport the program for use by or in connection with the instruction execution system, apparatus, or device.

The foregoing descriptions of specific embodiments of the present disclosure have been presented for purposes of illustration and description. Those are not intended to be exhaustive or to limit the present disclosure to the precise forms disclosed, and obviously many modifications and variations are possible in light of the above teaching. The exemplary embodiments have been chosen and described in order to best explain the principles of the present disclosure and its practical applications, to thereby enable others skilled in the art to best utilize the present disclosure and various embodiments with various modifications as are suited to the particular use contemplated. Modifications to embodiments of the present disclosure described in the foregoing are possible without departing from the scope of the present disclosure as defined by the accompanying claims.

The invention claimed is:

1. A method for providing a zero-knowledge membership proof, the method comprising:
   defining, in a setup phase, public parameters to be used for computing and verification of proof by a prover and a verifier, respectively;
   computing, by the prover, a commitment using the public parameters to a given ordered set X;
   sending, by the prover, the commitment to the given ordered set X to the verifier;
   receiving, by the prover, a query from the verifier for proving membership of a subset S sampled from the given ordered set X;
   computing, by the prover, a proof of membership providing that elements in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing two or more components of the vector $\vec{x}$ that are selected in same position as in the vector $\vec{x}$, and 0 in non-selected positions, based, at least in part, on the defined public parameters;
   sending, by the prover, the proof of membership to the verifier; and
   verifying, by the verifier, the proof of membership based on the defined public parameters.

2. The method of claim 1, wherein the prover, using the commitment, further claims to have computed a correct result for each of one or more linear operations performed over elements of the subset S.

3. The method of claim 2, wherein the query, received by the prover, from the verifier, further comprises a request for value Y resultant of a given linear operation performed over elements of the subset S.

4. The method of claim 3 further comprising:
   adding, by the prover, a matrix representative of the given linear operation to be performed over elements of the subset S to modify polynomials used to compute an inner product; and
   checking, by the verifier, for the modified polynomials while verifying the inner product.

5. The method of claim 1 further comprising updating, by the prover, the commitment, using the public parameters, in case of addition of new elements to the given ordered set X.

6. The method of claim 1, wherein the proof of membership is defined over an elliptic curve group.

7. The method of claim 1, wherein the commitment is a Pedersen commitment.

8. A system for performing data analysis on private data by implementing a zero-knowledge membership proof, the system comprising:
   a data provider device comprising a database configured to store private data therein;
   a data owner device, acting as a prover, configured to access and process the private data from the database; and
   a client device, acting as a verifier, configured to provide a query related to a group of elements of the private data for performing data analysis therefor,
   wherein public parameters to be used for computing and verification of proof by the prover and the verifier, respectively, are defined in a setup phase and shared therewith,
   wherein the prover is configured to:
   compute a commitment using the public parameters to elements of the private data, defined as a given ordered set X, and
   send the commitment to the given ordered set X to the verifier, wherein the verifier is configured to:
   send the query, to the prover, for proving membership of the group of elements defined as a subset S sampled from the given ordered set X, wherein the prover is further configured to:
   compute a proof of membership providing that the group of elements in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing two or more components of the vector $\vec{x}$ that are selected in same position as in the vector $\vec{x}$, and 0 in non-selected positions, based, at least in part, on the defined public parameters, and send the proof of membership to the verifier, and wherein the verifier is further configured to:

verify the proof of membership based on the defined public parameters.

9. The system of claim 8, wherein the prover, using the commitment, further claims to have computed a correct result for each of one or more linear operations performed over elements of the subset S.

10. The system of claim 9, wherein the query, received by the prover, from the verifier, further comprises a request for value Y resultant of a given linear operation performed over elements of the subset S.

11. The system of claim 10, wherein:

the prover is configured to add a matrix representative of the given linear operation to be performed over elements of the subset S to modify polynomials used to compute an inner product; and the verifier is configured to check for the modified polynomials while verifying the inner product.

12. The system of claim 8, wherein the prover is further configured to update the commitment, using the public parameters, in case of addition of new elements to the private data.

13. The system of claim 8, wherein the proof of membership is defined over an elliptic curve group.

14. The system of claim 8, wherein the commitment is a Pedersen commitment.

15. A system for performing identification of a customer by implementing a zero-knowledge membership proof, the system comprising:

a data owner device, acting as a prover, comprising a database to store identification data containing identities of a plurality of customers therein; and a client device, acting as a verifier, configured to provide a query to confirm identities of one or more given customers, from the plurality of customers, from the identification data, wherein public parameters to be used for computing and verification of proof by the prover and the verifier, respectively, are defined in a setup phase and shared therewith, wherein the prover is configured to:

compute a commitment using the public parameters for the identities of the plurality of customers, defined as a given ordered set X, and send the commitment to the given ordered set X to the verifier, wherein the verifier is configured to:

send the query, to the prover, for proving membership of identities of the one or more given customers defined as a subset S sampled from the given ordered set X, wherein the prover is further configured to:

compute a proof of membership providing that the identities of the one or more given customers defined in the subset S represented by a vector $\vec{s}$ are present in the given ordered set X represented by a vector $\vec{x}$, with the vector $\vec{s}$ and the vector $\vec{x}$ being of same length and the vector $\vec{s}$ containing two or more components of the vector $\vec{x}$ that are selected in same position as in the vector $\vec{x}$, and 0 in non-selected positions, based, at least in part, on the defined public parameters, and send the proof of membership to the verifier, and wherein the verifier is further configured to:

verify the proof of membership based on the defined public parameters.

16. The system of claim 15, wherein the prover is further configured to update the commitment, using the public parameters, in case of addition of identities of new customers to the identification data.

17. The system of claim 15, wherein the proof of membership is defined over an elliptic curve group.

18. The system of claim 15, wherein the commitment is a Pedersen commitment.

* * * * *